United States Patent [19]

Herndon

[11] 3,872,238

[45] Mar. 18, 1975

[54] 360 DEGREE PANORAMIC TELEVISION SYSTEM

[75] Inventor: John W. Herndon, Orlando, Fla.

[73] Assignee: The United States of America as represented by the Secretary of the Navy, Washington, D.C.

[22] Filed: Mar. 11, 1974

[21] Appl. No.: 450,125

[52] U.S. Cl. ........................ 178/6, 178/6.5, 178/7.85
[51] Int. Cl. ............................................. H04n 7/18
[58] Field of Search ................ 178/6, 6.5, 7.85, 6.8, 178/DIG. 1; 352/69

[56] References Cited

UNITED STATES PATENTS

| | | | |
|---|---|---|---|
| 2,966,096 | 12/1960 | D'Incerti | 352/69 |
| 3,542,948 | 11/1970 | Wolff | 178/6.5 |

*Primary Examiner*—Howard W. Britton
*Assistant Examiner*—Michael A. Masinick
*Attorney, Agent, or Firm*—R. S. Sciascia; J. W. Pease

[57] ABSTRACT

A 360° panoramic television system in which a plurality of stationary angularly spaced single line scan cameras receive 360° scene image inputs via a motor driven first optic system and pass amplified and processed video signals to a plurality of stationary, angularly spaced single line scan projectors which, via a motor driven second optic system, synchronized with said first optic system, provide a continuous 360° image display of said scene on a suitable curved screen.

4 Claims, 11 Drawing Figures

FIG. I

360 DEGREE PANORAMIC TELEVISION SYSTEM

BACKGROUND OF THE INVENTION

The invention is in the field of optics and television display systems and in particular relates to the taking and projecting of a 360° scene with high brightness and continuous raster display. The invention also relates to the field of training devices where the invention would advance the art in providing improved panoramic displays.

One conventional means for producing wide angle projection is the utilization of several projection TV sets arranged so that the rasters are contiguous. This requires careful edge matching of rasters and fails to conceal the edges. A conventional approach in the form of a single projector with a 360° panoramic lens also fails because of insufficient brightness of the resulting image. A high brightness display can be achieved by rotating several projectors about a central axis, operating the TV in a vertical single stroke scan mode. This approach results in a continuous raster and the desired brightness. The disadvantage is the large mass which must be rotated at a high rate. Other avenues considered have been the use of rotatable mirrors and the use of multiple gun rotatable television heads, but acceptable results in these areas have not been obtained.

SUMMARY OF THE INVENTION

The subject invention contemplates a plurality of separate optical channels for image reception from a scene and a plurality of separate optical channels for image projection on a 360° screen, with all elements mounted in stationary positions including camera equipment and projector equipment, except for a few rotatable prisms in the receiving and projecting optical channels, whereby only a relatively small mass of material requires rotation to provide the requirements of brightness and contiguous raster. In this arrangement the invention further contemplates the provision of vertical, single line scan camera and projector means arranged respectively in spaced angular disposition about central vertical axes of scene and screen. Further details of novelty relate to the selection and arrangement of prisms to provide compact packaging for minimum space requirements.

DESCRIPTION OF THE PREFERRED EMBODIMENT

Figure 1:
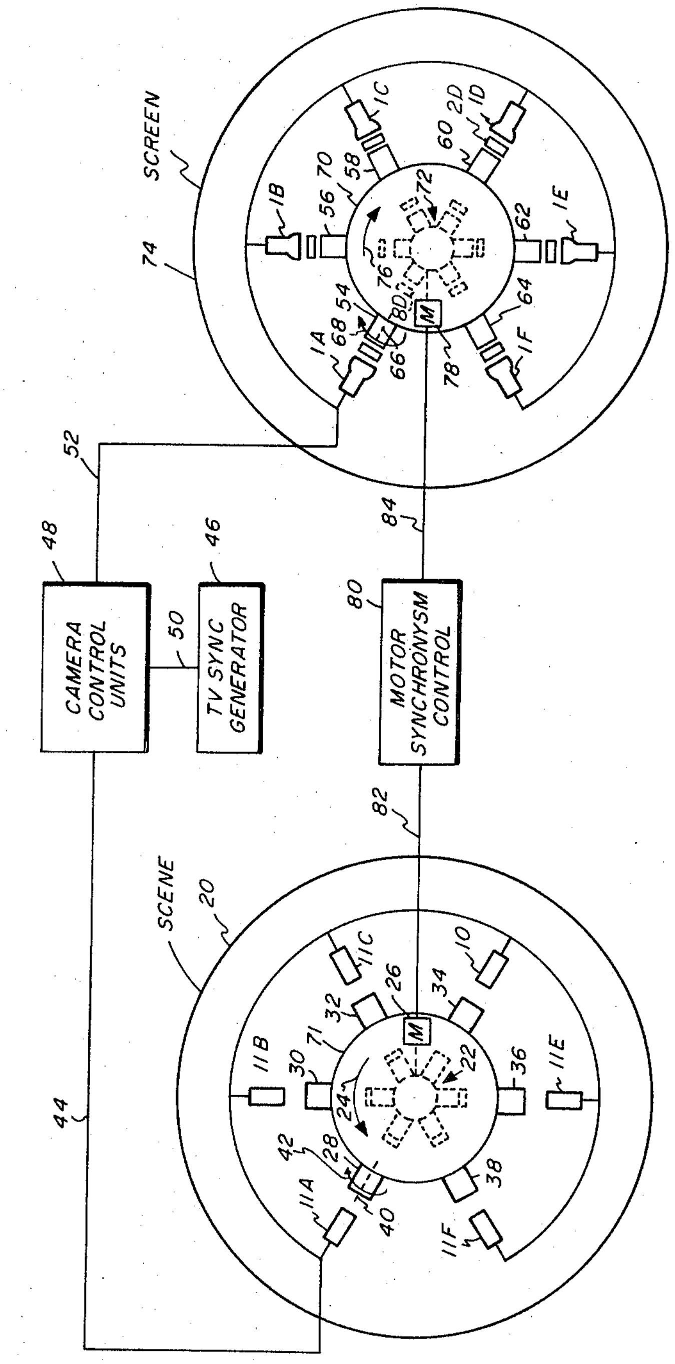
FIG. 1 is a schematic view of a 360° panoramic television system incorporating the invention.

Referring to the drawing, FIG. 1 provides a schematic view of the general arrangement of elements in a 360° panoramic television system incorporating the invention and depicting a six channel reception and projection system.

In the arrangement shown in FIG. 1, a 360°scene, depicted at 20, is viewed by angularly spaced cameras 11A through 11F through the medium of six optic systems for image collection. The six systems, which might also be referred to as six channels, comprise a stationary prism means, a rotatable dove prism means and separate additional rotary prism means. These will be identified in detail in the description of FIGS. 2 through 8. For the moment it is sufficient to understand that the additional rotary prism means indicated generally in FIG. 1 at 22 is rotatable in the direction indicated by arrow 24 by the motor drive means indicated by block 26. Further, that the rotatable dove prism means are located one in each of six housings 28, 30, 32, 34, 36, 38 each of which is rotatable, also by the motor M, about its associated radial axis. Thus, for example, housing 28 is rotatable about axis 40 as indicated by arrow 42. To recapitulate, the scene image is passed from the scene 20 through the rotatable prism means 22 and the prisms in the rotatable prism housings 28 – 38 to the associated cameras 11A through 11F.

The video signals thus obtained are passed by cable 44 to a plurality of camera controls, one for each camera and indicated at 48. Each camera control unit is any conventional camera control unit for amplifying and processing the camera video signal. Also fed to the camera control units 48 is the necessary television (T.V.) sync signal from a conventional T.V. sync generator unit 46 connected to the camera control units 48 by cable 50.

The respective processed video signals originating from the cameras 11A through 11F are passed from the camera control units 48 on cable 52 to the respective projectors 1A through 1F which are part of an associated six channel, six optic system projection system. The prism arrangement for the projection systems is identical with that above described for the image reception system. Thus, the projection system comprises six housings 54, 56, 58, 60, 62 and 64 rotatable each on a radial axis and each housing a dove prism. For example, housing 54 rotates on radial axis 66 in the direction of arrow 68. The main housing 70 for the projection equipment is stationary as is the main housing 71 housing the image reception equipment. The additional rotatable prisms indicated generally at 72 in the projection system are rotated about the central vertical axis of the screen 74 as indicated by the arrow 76. The housings 54 through 64 and the prisms, generally indicated at 72, are rotated by the sync motor 78. Motors 26 and 78 are synchronized together by a motor synchronism control 80 of conventional nature and connected thereto by cables 82 and 84.

In the system above generalized in description the cameras and associated optic systems and the projectors and associated optic systems are angularly disposed radially at 60° such that the six channels of reception and projection each cover the 360° scene and 360° screen to transfer a continuous image from the scene to the screen.

Figure 2:
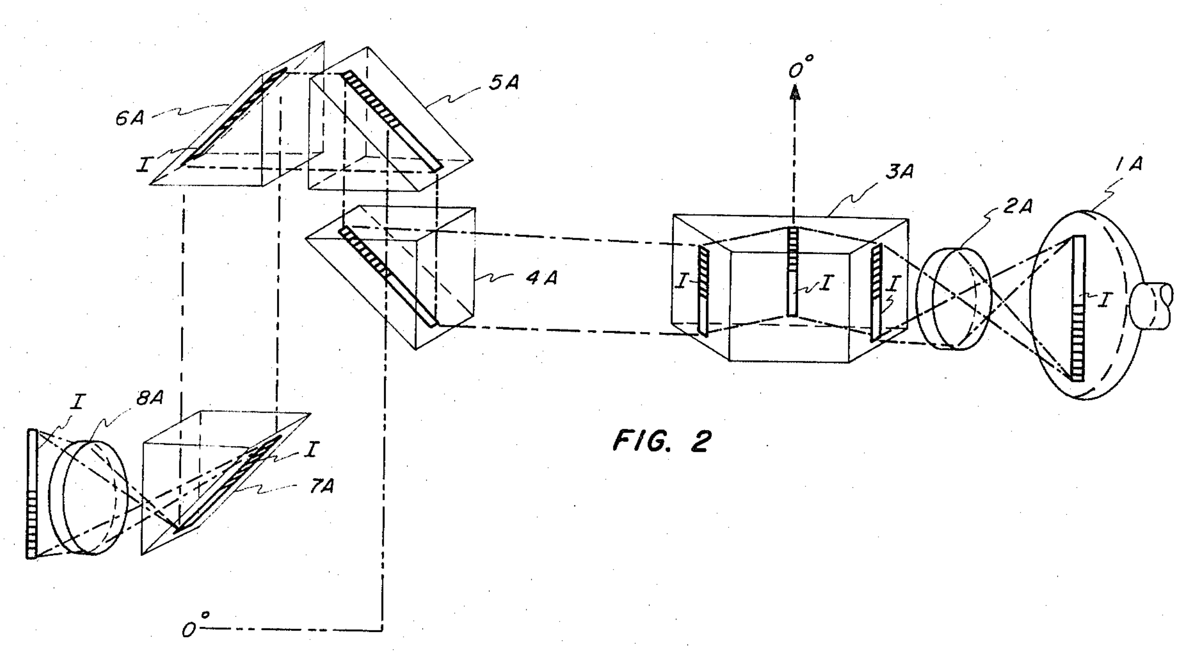
FIGS. 2 – 5 are diagrammatic illustrations of prism arrangement and progressive relative motion of rotating prisms in projecting a single line scan image for display upon a 360° screen.

Having the general overall description in mind, attention is now directed to FIGS. 2 through 5 for an understanding of the specific optic systems. It is to be noted that in the embodiment described herein the image reception optic systems are the same as the projection systems and a description of the latter should suffice for both. FIG. 2 shows the projector 1A with a vertical single line image I. The image I is inverted and collimated through a fixed position lens 2A. The remainder of the optic system includes a rotatable dove lens 3A, a fixed right angle lens 4A, additional rotatable prism means including the prisms 5A, 6A and 7A and a projection lens 8A.

Considering the operation of the lens system, in the zero degree attitude shown in FIG. 2, dove prism 3A reflects the image I but does not change it from the vertical position. The fixed position right angle prism 4A receives the image I from the dove prism 3A and reflects it upward to the right angle prism 5A. Prism 5A is oriented toward the zero degree azimuth position and reflects the image I to right angle prism 6A. Prism 6A is in vertical alignment with right angle prism 7A and thus the image I is reflected to prism 7A. Projection lens 8A reverses the image I to the original orientation as shown at the source 1A. The final display of the image I is on the display screen 20 (FIG. 1) at the zero degree azimuth for the conditions shown in FIG. 2.

Figure 3:
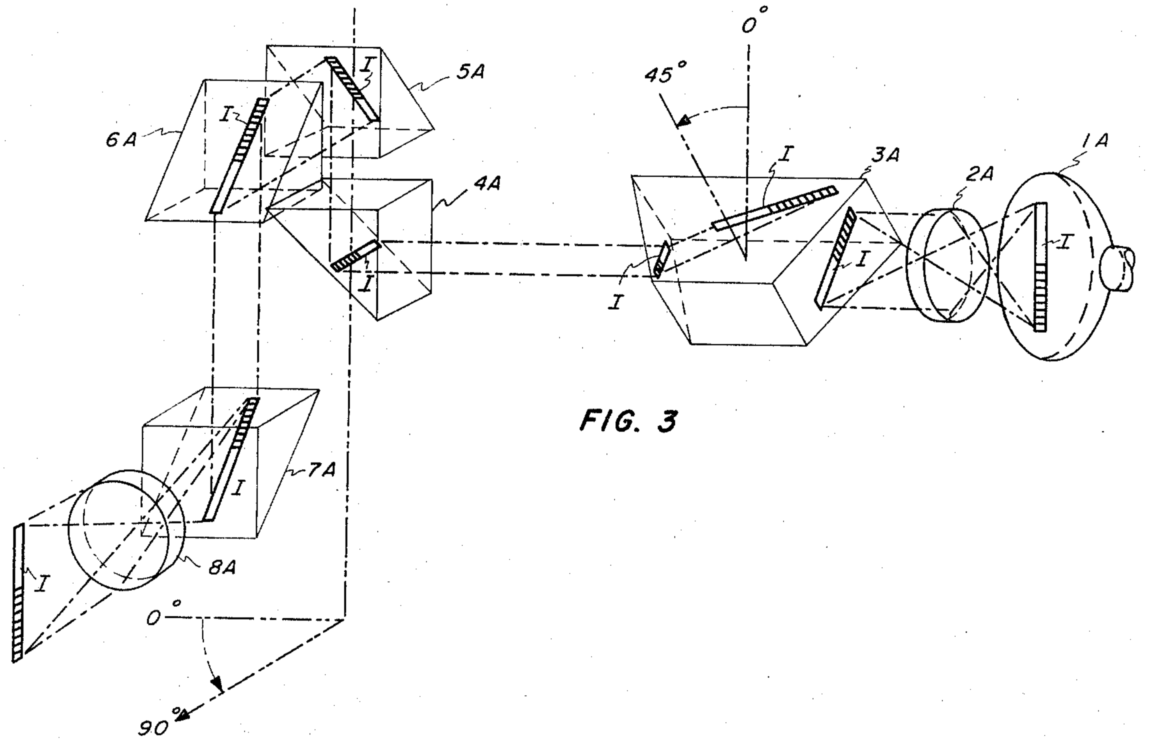

FIG. 3 shows the same optic channel as described above but with the rotatable elements in the 90° sweep of the projected image I. It is to be noted that the dove prism is rotated only one-half of the 90° sweep angle. The image I from the projector 1A is reversed through the collimating lens 2A and enters dove prism 3A in alignment with the diagonal axis of the prism 3A. The reflected image I at the exit of prism 3A is horizontal. Thus, when reflected by prism 4A, the resultant image I to be reflected by prism 5A is again vertical and the resultant final image I is as desired after following the optical path through prisms 6A and 7A and lens 8A.

Figure 4:
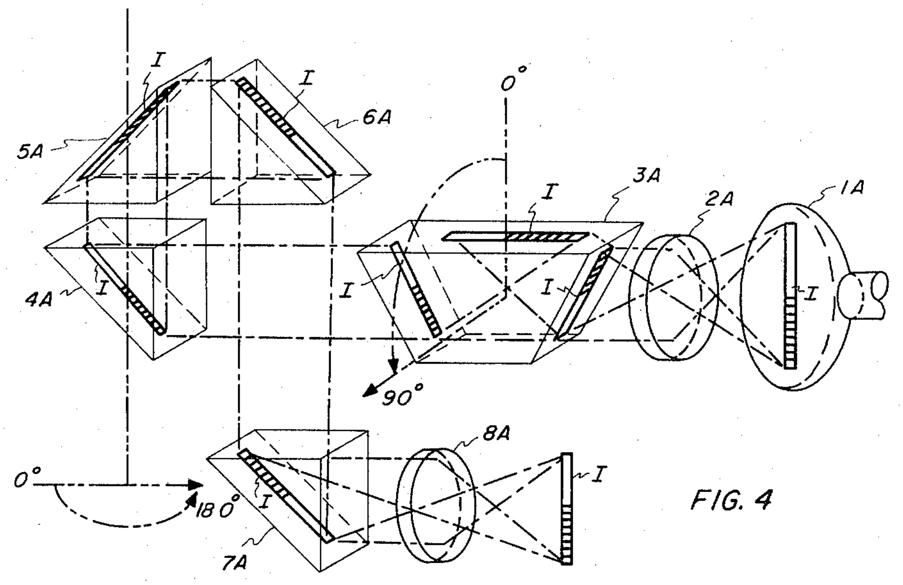

FIG. 4 shows the advancement of the sweep by another 90° to the 180° azimuth point. Under this condition the dove prism 3A moves through only one-half of this angular sweep and is at the 90° point. The image I is inverted by lens 2A, again inverted by prism 3A and is reflected from prism 4A to present the image I at prism 5A in proper orientation for correct final presentation through the remainder of the optical path prisms 6A, 7A and lens 8A.

Figure 5:
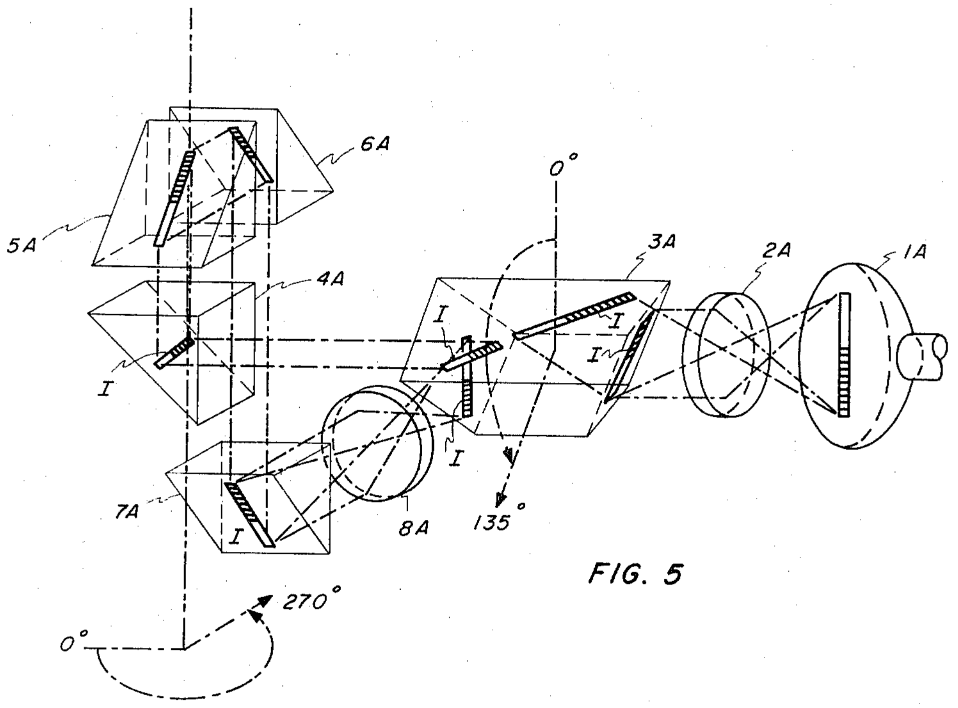

FIG. 5 carries the sweep action to the 270° point as regards the rotatable additional prisms 5A, 6A and 7A, with corresponding proportional change in prism 3A, i.e., to 135 degrees, to again present the correct final image.

The above describes the basic action of applicant's rotatable prism system. Additional prisms 5A, 6A, 7A and projection lens 8A, all move as a unit continuously through 360° rotations. The system center axis of rotation is through prism 5A. Prism 4A remains fixed in orientation and is aligned radially with the longitudinal axis of the dove prism 3A. The dove prism is rotated about its longitudinal axis continuously through 360° rotations and is in alignment with the fixed position collimating lens 2A. The rotation rate of the dove prism is one-half of that of the additional prism units. The radial axis through the dove prism 2A is in alignment with the center axis of the fixed position projector 1A.

Figure 10:
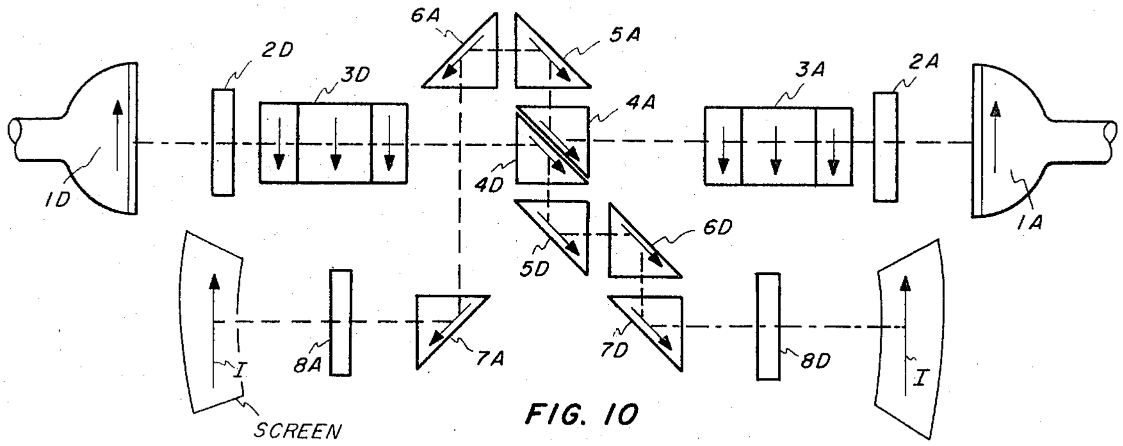
FIGS. 10 and 11 are diagrammatic illustrations of preferred prism arrangements employed to reduce the space required for the optic systems respectively in the projector and camera optic channels.

The above arrangement of prisms could be used for all six channels, i.e., six optic systems, of the preferred embodiment. However, this would mean stacking all six channels in six layers, i.e., one layer for each projector. In a further aspect of my invention, the arrangement is modified such that 180° removed projectors can be positioned at the same level. This is shown in FIG. 10 wherein the arrangement of the elements 1A through 8A remain the same. However, for the channel D, i.e., elements 1D through 8D they will be arranged as shown in FIG. 10. The image I is thus passed in channel D from projector 1D through fixed position collimating lens 2D, through rotatable dove prism 3D, downwardly reflected from stationary prism 4D and passed through rotatable additional prisms 5D, 6D and 7D to outwardly facing projection lens 8D which rotates with elements 5D, 6D and 7D.

Figure 6:
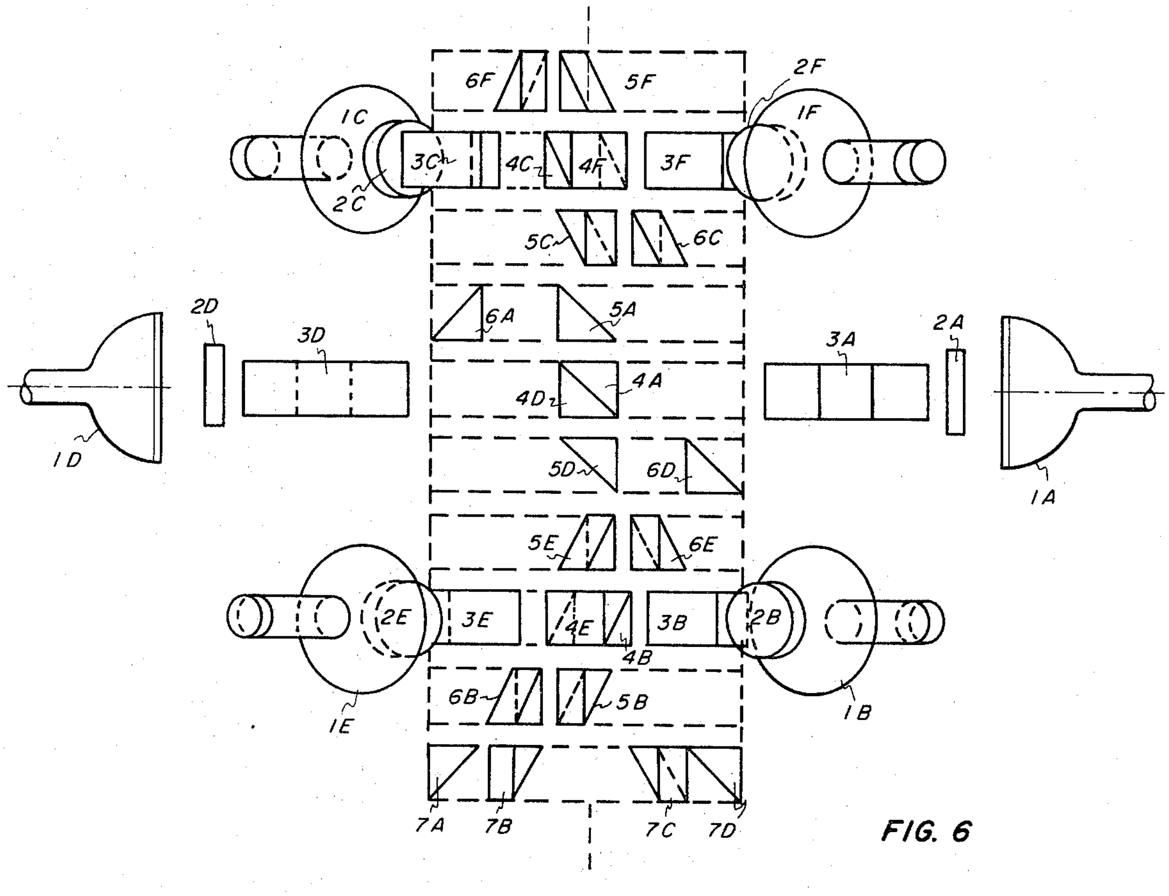
FIG. 6 is a vertical elevation diagrammatic view showing a preferred arrangement of optical systems incorporating the invention as set up with six optic channels.
Figure 7:
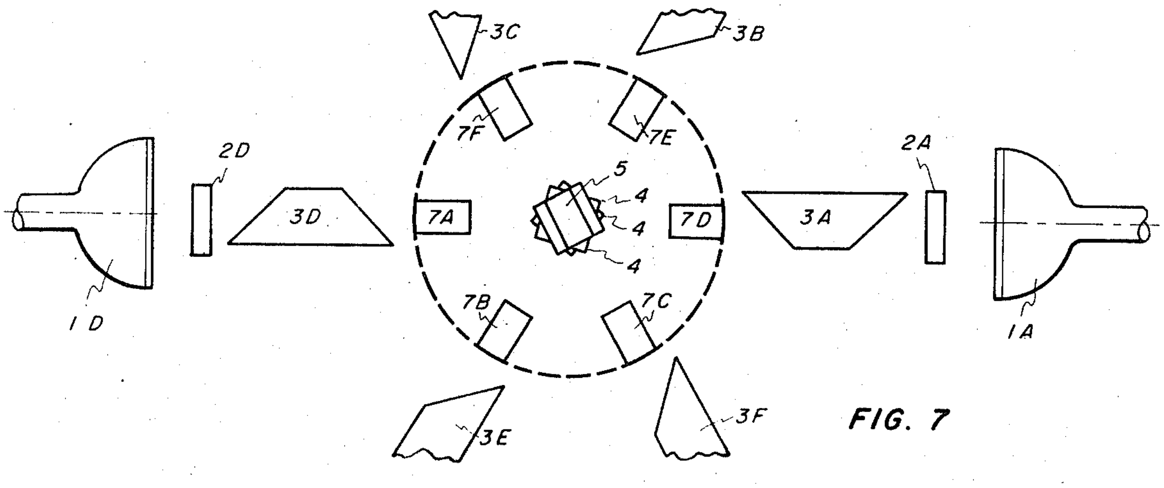
FIG. 7 is a diagrammatic plan view of FIG. 6.

FIG. 6 illustrates the above described compact arrangement of a six channel optic system with pairs of projectors utilizing a single level instead of requiring alternating levels. Thus, at the same respective levels are 1F and 1C; 1A and 1D; 1B and 1E. In FIG. 6 each channel is shown in the respective positions held when projector 1A is in the zero azimuth position shown in FIG. 1 and FIG. 10. Each prism 6, i.e., 6A, B, C, D, E, F, is aligned above its respective prism 7, i.e., 7A, B, C, D, E, F and there is a clear optical path through the stack between the prisms 6 and 7. Prisms 4 have horizontal axis alignment with their respective dove prisms 3, lens 2 and projectors 1. Each channel is displaced in azimuth by equal angles which depend upon the number of channels used. The above is further illustrated in the plan view FIG. 7, which, in the example, shows a 60° displacement between adjacent channels.

Figure 8:
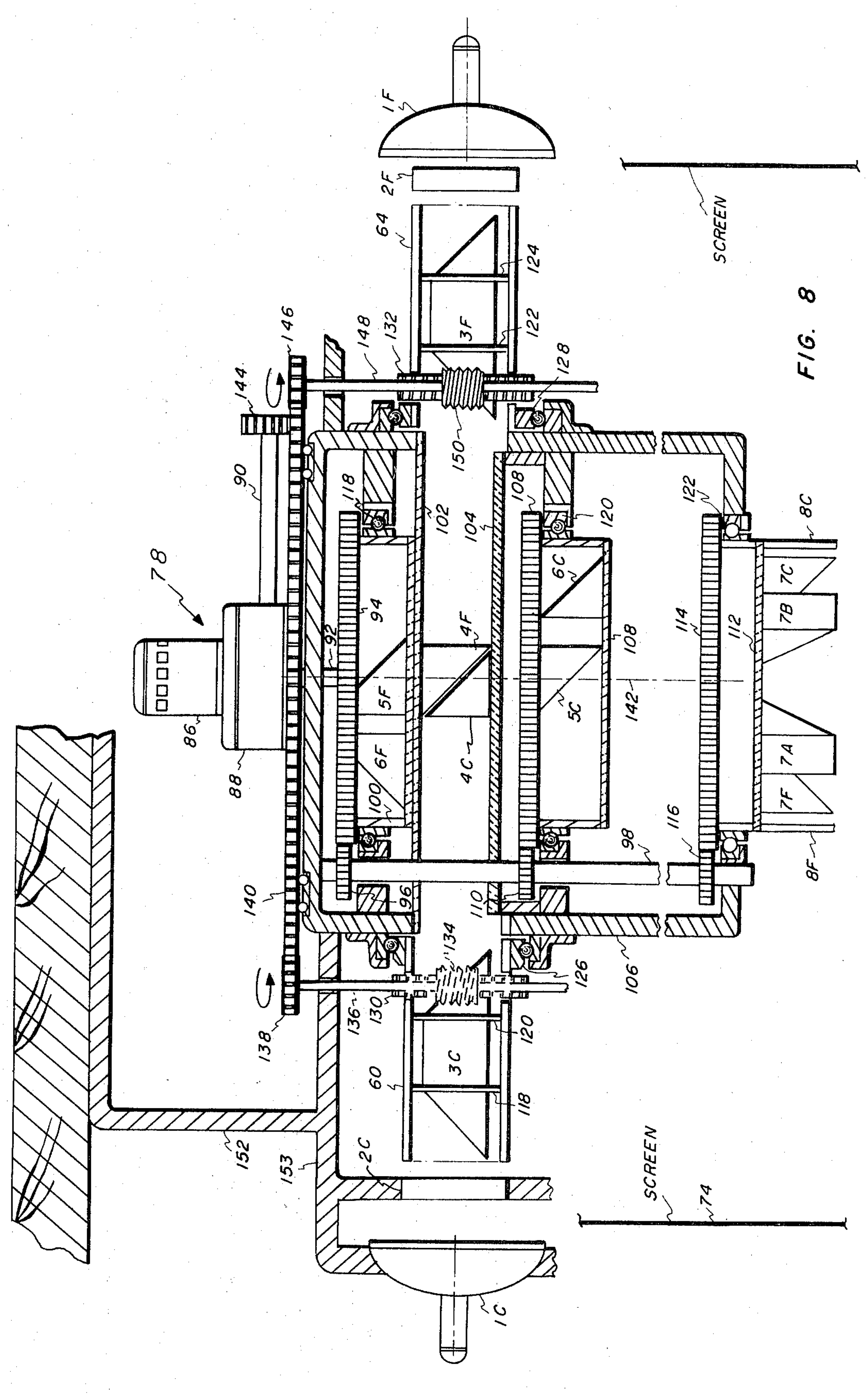
FIG. 8 is an elevational partial view partly in cross section provided to explain one suitable arrangement of rotatable support and drive means for the optic systems employed in the invention.
Figure 9:
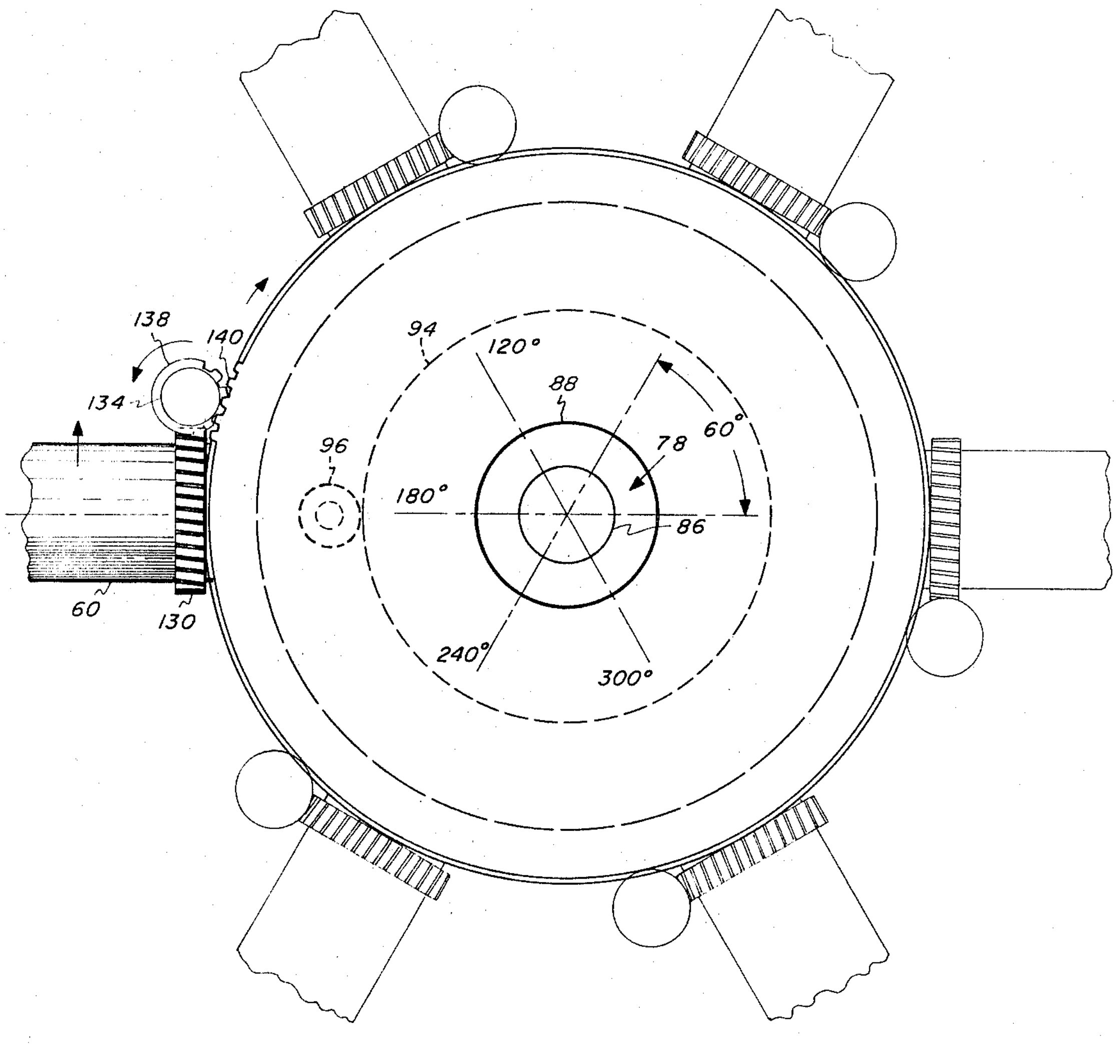
FIG. 9 is a partial diagrammatic plan view of FIG. 8.

In FIG. 8 is shown one suitable arrangement for support and drive means for the six channel system described above. The drive means, generally indicated by numeral 78, includes a common drive motor 86 which drives a gear box 88 having output shafts 90 and 92. Shaft 92 via gears 94 and 96 drives vertical shaft 98 from which all of said additional rotatable prisms 5, 6, 7 and lens 8 are rotated. As shown in FIG. 8 prisms 6F and 5F are fixed to an optical glass support 100 supported from gear 94. At this point to avoid repetition it will be noted that any suitable means may be used to support the prisms, such as 6F and 5F to their associated optical support means, one means being by the application of edge cement applied so as not to interfere with the optical path of image rays. Prisms 4F and 4C are stationary and thus fixed to stationary optical glass supports indicated at 102 and 104 which are supported by the main housing 106 of the optical systems. The rotatable prisms 5C and 6C are fixed to optical glass support 108 which is fixed to and rotated by gear 108 driven by gear 110 from common shaft 98. In the same manner all of the elements 7 and associated projector lens 8 are mounted on an optical glass support 112 driven via gears 114 and 116 from common shaft 98 and supported from gear 114. The gears 114, 108 and 94 are provided with bearings indicated at 118, 120 and 122 for rotatable support in the main housing 106.

In order to rotate the prisms 3, each about its longitudinal axis, the prisms are mounted in projecting radial cylindrical housings as exemplified by housings 60 and 64 which support dove prisms 3C and 3F. Support means for the prisms in the housings are indicated at 118, 120, 122 and 124. Bearing means for rotation of the housings 60 and 64 are shown at 126 and 128. Each of the housings, exemplified by 60 and 64 is fitted with a circumferential gear, examples 130 and 132. Gear 130 is driven via a worm gear 134, vertical shaft 136 and drive gear 138 from a common ring gear 140 supported for rotation on the housing 106 about the vertical axis 142. The gear 140 is driven from the motor 78 via gear box 88, drive shaft 90 and drive gear 144. Housing 64 is similarly driven from the common ring gear 140 via gear 146, shaft 148, worm gear 150 and housing gear 132. The gearing shown is selected such that the dove prisms are rotated at one-half the speed of the prisms 5, 6, and 7 (C or F) and lens 8 (C or F).

To support the projectors including 1C and 1F shown, the lenses including 2C and 2F shown and the main housing 106 with its mounted elements, any suitable support means is employed which will not interfere with the passage of the image rays. In FIG. 8 a single schematic support is shown at 152 and 153.

In FIG. 8 then, an image is projected inwardly from 1C and passes through collimating lens 2C, rotatable dove prism 3C, stationary prism 4C, rotatable additional prisms 5, 6 and 7C, and passed radially outward through rotatable projection lens 8C. From 1F a projected image passes through 2F and 3F, is diverted upwardly by 4F, moved outwardly and redirected downwardly by prisms 5F and 6F and is redirected outwardly by prism 7F through projecting lens 8F. FIG. 8 is broken off to simplify the drawing, it being understood that the pairs of channels A and D and B and E shown in FIG. 6 are mounted as shown and described in detail for channels F and C.

Figure 11:
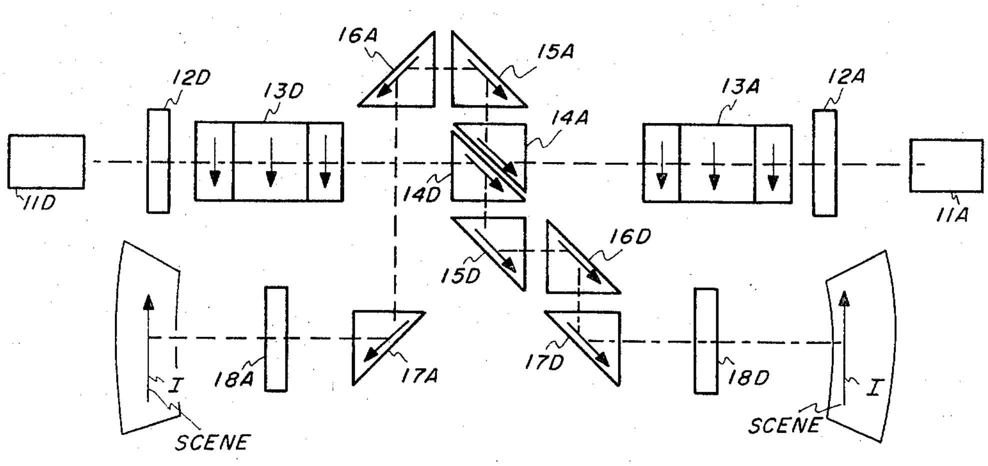

It is further to be understood that the details of elements and arrangements described above for the projection channels are the same for the image reception, i.e., the camera channels. Thus, as shown in FIG. 11 and as compared to FIG. 10, the arrangement is the same except that the image comes in from the scene via an image lens 18A and passes back via the same arrangement of elements, i.e., 17A, 16A, 15A, 14A, 13A, 12A to the camera 11A. For the same level companion cameras at 180° displacement, the image path is via 18D down to the camera 11D.

The fact that the television projectors and cameras and the mounting and drive housing, i.e., the main mass, can be rigidly mounted and operated in fixed position with rotation applied to only prism portions of the optic system, provides a definite advantage to the subject invention.

It will be appreciated also that the invention provides a compact, dynamically balanced unit that can present a continuous display with a high level of brightness. The invention enables the use of multiple projection sets to provide a uniform display raster which is a distinct advantage over the use of multiple projection sets with contiguous rasters.

While the subject invention has been described in relation to a preferred embodiment thereof, it is to be understood that variations in structure and arrangement may be made without departing from the true spirit and scope of the invention or the scope of the appended claims.

What is claimed is:

1. A 360° panoramic television system for taking continuous images covering a 360° scene and projecting the same on a 360° screen, the taking and projecting emanating along radii from central vertical axes respectively of said scene and screen comprising:

a plurality of stationary vertical, single line scan, camera tubes equally, angularly spaced and each aimed inwardly along an associated radius of said scene toward the vertical axis thereof;

a plurality of stationary vertical, single line scan, projectors equally, angularly spaced and each aimed inwardly along a radii of said screen toward the vertical central axis thereof;

amplifying and processing control until means connectd to pass video signal information from said cameras to said projectors;

a first optical system including a plurality of image collection optical prism and lens means and a second optical system including a plurality of image projection optical prism and lens means, each having rotatable mounting means for prism portions thereof and positioned respectively in relation to said cameras and projectors to pass images from said scene to said cameras and from said projectors to said screen, and synchronized motor drive means for rotating said prism portions of optical systems in unison to produce a 360° panoramic transfer of image to said screen.

2. Apparatus according to claim 1 said first optical system including for each camera first dove prism means and means mounting the same with its entrance and exit surfaces on its associated scene radius and supported for rotation about said radius as a rotational axis to pass image light to its associated in line camera;

stationary first right angle prism means and means mounting said prism on said scene vertical and associated dove prism axes;

first additional rotatable right angle prism means and rotatable mounting means therefor;

said additional prism means beging positioned to collect scene images and pass the same through said stationary right angle prism to said dove prism;

said second optical system including for each projector:

second dove prism means and means mounting the same with its entrance and exit surfaces on its associated screen radius and supported for rotation about said radius as a rotational axis;

stationary second right angle means and means mounting said prism on said screen vertical and dove prism rotational axes for causing light projected by said projector through said dove prism means along said radius to be redirected along said screen vertical axis;

second additional rotatable right angle prism means and rotatable mounting therefor;

said second additional prism means being positioned to direct said projector light radially outwardly toward said screen.

3. Apparatus according to claim 2 said synchronous motor drive means including for said first and second optical systems drive means for rotating said first and second additional prism means about their associated scene and screen vertical axes while rotating said first and second dove prism means about their associated scene and screen radii at one-half the angular speed of rotation of said additional prism means.

4. Apparatus according to claim 2 said first and second stationary right angle means, each including a pair of right angle prisms mounted back to back to effect direction change between vertical and radial on a first common level and where the radial directions are 180° apart;

said first and second additional prism means each including a pair of radially spaced prisms positioned on 180° displaced radial axis of a second common level, series spaced prisms for directing image rays in one vertical direction between one of said spaced prisms and one of said stationary prisms, and back to back radially spaced right angle prism means for reversing image rays and directing the same between the other of said stationary and spaced prisms to provide a minimum space requirement for said first and second optic systems.

* * * * *